United States Patent [19]

Gaul et al.

[11] Patent Number: 5,091,839
[45] Date of Patent: Feb. 25, 1992

[54] METHOD AND APPARATUS FOR SUPPLYING VOLTAGE TO A THREE-PHASE VOLTAGE SYSTEM HAVING A LOAD-CARRYING NEUTRAL CONDUCTOR WITH A PULSE WIDTH MODULATED THREE PHASE INVERTOR

[75] Inventors: Hartmut Gaul, Altenkirchen; Albert Mueller, Erlangen, both of Fed. Rep. of Germany

[73] Assignee: Siemens Aktiengesellschaft, Berlin and Munich, Fed. Rep. of Germany

[21] Appl. No.: 586,519

[22] Filed: Sep. 21, 1990

[30] Foreign Application Priority Data

Sep. 25, 1989 [EP] European Pat. Off. ........ 89117665.4

[51] Int. Cl.$^5$ .................... H02J 3/26; H02M 1/084; H02M 5/458
[52] U.S. Cl. ........................ 363/41; 307/45; 307/87; 363/79
[58] Field of Search ............ 363/41, 79, 98; 307/45, 307/87

[56] References Cited

U.S. PATENT DOCUMENTS

| | | | |
|---|---|---|---|
| 4,063,143 | 12/1977 | Forstbauer | 363/41 |
| 4,367,522 | 1/1983 | Forstbauer et al. | 363/137 |
| 4,719,557 | 1/1988 | Forstbauer et al. | 363/79 |

FOREIGN PATENT DOCUMENTS

0208088 1/1987 European Pat. Off. .
3012232 10/1981 Fed. Rep. of Germany .
3236071 1/1984 Fed. Rep. of Germany .

Primary Examiner—William H. Beha, Jr.
Attorney, Agent, or Firm—Kenyon & Kenyon

[57] ABSTRACT

To maintain a defined three-phase voltage system at the output terminals of a transformer device TE, for example, a transformer in a delta/wye connection where the primary-side neutral point is unconnected, even when an asymmetrical load is connected to it and to the secondary-side neutral point, single-phase transformers are used, whose primary windings are supplied with voltage by a pulse-width modulated, three-phase invertor in a bridge connection. Through the use of voltage regulators, the actual values of the secondary-side line voltages form the control voltages for each bridge-arm pair. The closed-loop control circuits of the three phase voltages are broken down in accordance with the structure of the transformer device by means of a breakdown element. The setpoint values can be calibrated to a synchronizing voltage, and/or a current control for the conductor currents is superposed on the voltage regulators.

26 Claims, 5 Drawing Sheets

METHOD AND APPARATUS FOR SUPPLYING VOLTAGE TO A THREE-PHASE VOLTAGE SYSTEM HAVING A LOAD-CARRYING NEUTRAL CONDUCTOR WITH A PULSE WIDTH MODULATED THREE PHASE INVERTOR

BACKGROUND OF THE INVENTION

The present invention relates to a method and a device for supplying voltage to a three-phase voltage system having a load-carrying neutral conductor. More particularly, the present invention relates to regulators for controlling such a system.

German Application No. DE-A-32 36 071, shows the options of supplying synchronous voltage to a three-phase system or supplying a synchronous voltage to a secondary distribution network through an invertor. The invertor can be, in particular, a pulse-controlled invertor having an input for controlling the amplitude and frequency of the output voltage. A controlled variable for the frequency can be supplied by a superposed active-current regulator, and a controlled variable for the amplitude can be supplied by a superposed reactive-current regulator. The control of frequency and amplitude by the invertor stems from the generation of a symmetrical and zero-sequence-free system of invertor output voltages. This frequency and amplitude control system can only compensate for asymmetrical load surges with difficulty or not at all, especially when the load is connected asymmetrically between the phase conductors and a load-carrying neutral point.

As is shown in U.S. Pat. No. 4,367,522, in supplying a three-phase voltage system having a connected neutral point, each individual phase conductor of the three-phase voltage system can be fed by its own 4-pulse bridge circuit (B4 invertor) having a separate control device. The three setpoint voltage values of these control devices are specified as a three-phase, symmetrical system of reference vectors. Each invertor is switched to the primary side of a single-phase transformer without forming a connected neutral point. The secondary sides are joined at one end to a load-carrying neutral point which can be connected to the neutral conductor. The secondary sides are joined at their other ends to the phase conductor of the three-phase voltage system. This transformer device is augmented by a filter comprised of inductors and capacitors, preferably short-circuit limiting reactors and shunt capacitors. This method quickly compensates for harmonic voltages, which are generated by harmonic currents having a low harmonic number due to non-linear loads at the internal resistance of the employed invertor configuration. The total harmonic content can be kept at less than 5%. Load surges can also be quickly compensated using this method. Thus, with this method, any system can be supplied having three line voltages and respective conductor currents. However, the power circuitry is relatively high in cost due to the three separate bridge invertors and the required regulating component for this circuitry.

As shown in U.S. Pat. No. 4 719 557, a 6-pulse bridge circuit is used to feed a three-phase voltage system. One bridge-arm pair, each pair comprising two in-line invertor valves, is connected at its junction point to one input of a transformer device. The other connecting terminals of each bridge-arm pair are coupled to a defined input d.c. voltage. The primary-side neutral point of the transformer device is not coupled to other parts of the installation or is not provided at all. This method allows for considerable savings on the cost of installation. With these earlier methods, three separate voltage-control devices form three individual, pulse-width modulated actuating signals from the three measured values of the line voltages and the three zero-sequence-free, symmetrical, setpoint voltage values for the bridge-arm pairs. In the closed-loop control system of the voltage-control devices, a conversion is undertaken from secondary-side line voltages to primary-side voltages corresponding to the structure of the transformer device. Since, however, the invertor only allows a zero-sequence-free system of currents and voltages to be supplied, the three separate control devices are redundant in the system. Therefore, these three controllers affect each other and interfere with the control response of the system. Instabilities can occur if a proportional-action controller is not used.

There is a need for a method that uses only two voltage regulators, whose setpoint values characterize a symmetrical, zero-point-free system, and to compare only two actual voltage values. The pulse-width modulated output signals of the two regulators control two of the three bridge-arm pairs. The third bridge-arm pair is controlled by a signal that is formed through the appropriate summation of the two other control signals and through pulse-width modulation.

Using this method, a symmetrical voltage system can be maintained in a passive network, in spite of quickly changing and asymmetrical loads. Thus, the currents flowing into the network freely adapt to the changing loads.

If, however, the three-phase voltage system is already supplied by other voltage sources (e.g., a supply system and/or other invertors), it is often desired to control or regulate the distribution of the currents flowing into the network.

Therefore, there is also a need for a symmetrical voltage system in a three-phase voltage system having a load-carrying neutral conductor, even when the three-phase voltage system is supplied in parallel by another voltage source. There is also a need for a voltage system that is maintained with minimal expenditure.

SUMMARY OF THE INVENTION

These and other needs are satisfied by the method and device of the present invention for supplying voltage to a three-phase voltage system having a load-carrying neutral conductor. Setpoint values of a symmetrical setpoint voltage system are formed from a setpoint value and from a controlled, instantaneous, phase-angle setpoint value. The phase difference between a synchronizing voltage system and a symmetrical setpoint voltage system is formed. A frequency-controlled oscillator device is controlled using this phase difference. The controlled phase-angle setpoint value and the setpoint values of the symmetrical setpoint voltage system are tapped off of the oscillator device. One setpoint voltage value of the symmetrical setpoint voltage system and one actual voltage value of an actual voltage system (formed from the measured voltage values of the three-phase voltage system) are fed, respectively, to a separate voltage-controlled device. Three individual voltage control signals are formed from the output signals of the voltage control devices and pulse-width modulated. One bridge-arm pair of a three-phase, are pulse-width controlled bridge-pulse-controlled invertor is controlled with each of the pulse-width modulated individual voltage control signals. The output voltages of the bridge-arm pairs are coupled to three primary connecting terminals of a transformer device which possesses a neutral point on the secondary side only. The neutral conductor of the three-phase voltage system is coupled to the neutral point of the secondary side. The secondary connecting terminals of the transformer device are coupled to the phases of the three-phase voltage system. In the closed-loop control circuit of the control devices, the secondary side voltages are converted into primary side voltages corresponding to the structure to the transformer device.

In an alternative method of the present invention, an actual-current-value system of currents flowing into the three-phase voltage system is measured at the respective phase connecting terminal of the three-phase voltage system and the system deviation between a setpoint current value and an actual value of the actual-current value system is formed from a system of setpoint current values which are zero-phase-sequence free. A current-control signal is formed from every system deviation via a current-control device. Three pulse-width modulated individual control signals are formed from the current-control signals. One bridge-arm pair of a three-phase, pulse-width controlled invertor is controlled, respectively, by each of the pulse-width modulated individual control signals. The output voltages of the bridge-arm pairs are coupled to three primary connecting terminals of a transformer device. The transformer device has a connected neutral point on the secondary side only. The neutral conductor of the three-phase voltage system is coupled to the connected neutral point. The secondary connecting terminals of the transformer are coupled to the phases of the three-phase voltage system. In a closed loop control circuit of the current-control devices, the secondary-side voltages are converted into primary-side voltages corresponding to the structure of the transformer device.

A device of the present invention comprises three-phase conductors of a three-phase voltage-system which are coupled to the three secondary connecting terminals of a transformer device. The secondary neutral point of the transformer device is coupled to the neutral conductor. The transformer does not have a primary neutral point. Three primary connecting terminals of the transformer device are coupled via respective three-phase current connecting terminals to a bridge-arm pair of a three-phase pulse-controlled invertor. Voltage measuring sensors are mounted at the secondary connecting terminals and form a system of actual voltage values which are zero-phase-sequence free. A voltage-control device with a setpoint-value input and an actual-value input is provided for each actual voltage value, whereby the actual voltage value is impressed upon the actual-value input. Three pulse-width modulators, which each furnish a pulse-width-modulated control signal for the controllable valves of the bridge-arm pairs, are coupled to the outputs of the voltage-control devices. A break-down device is provided in the closed-loop control circuit of the voltage-control device, which in accordance with the structure of the transformer device, converts secondary-side voltages of the transformer device into primary-side voltages. A synchronizing device with an input for a synchronizing voltage system and outputs for synchronized setpoint voltage values of a setpoint-voltage-value system which are zero-phase-sequence free is coupled to an output for a setpoint value at the setpoint-value input of one of the voltage-control devices. In the synchronizing device, a phase-difference detector forms the instantaneous phase difference between the synchronizing voltage system and the setpoint-voltage-value system. The phase difference controls an angle controller with a frequency-controlled oscillator device, with a setpoint-value-amount input, which has an added setpoint value amount, and with outputs for the synchronized setpoint voltage values, which are supplied both to the setpoint-value outputs of the synchronizing device as well as to the phase-difference detector.

The main field of application for the present invention is in the supplying of voltage to remote consumers (i.e. those consumers not connected to a public electricity supply system) and to mobile vehicle electrical systems or to busbars which are protected from failures and voltage fluctuations and which are used to supply voltage to fault-sensitive devices.

DETAILED DESCRIPTION

Figure 1:
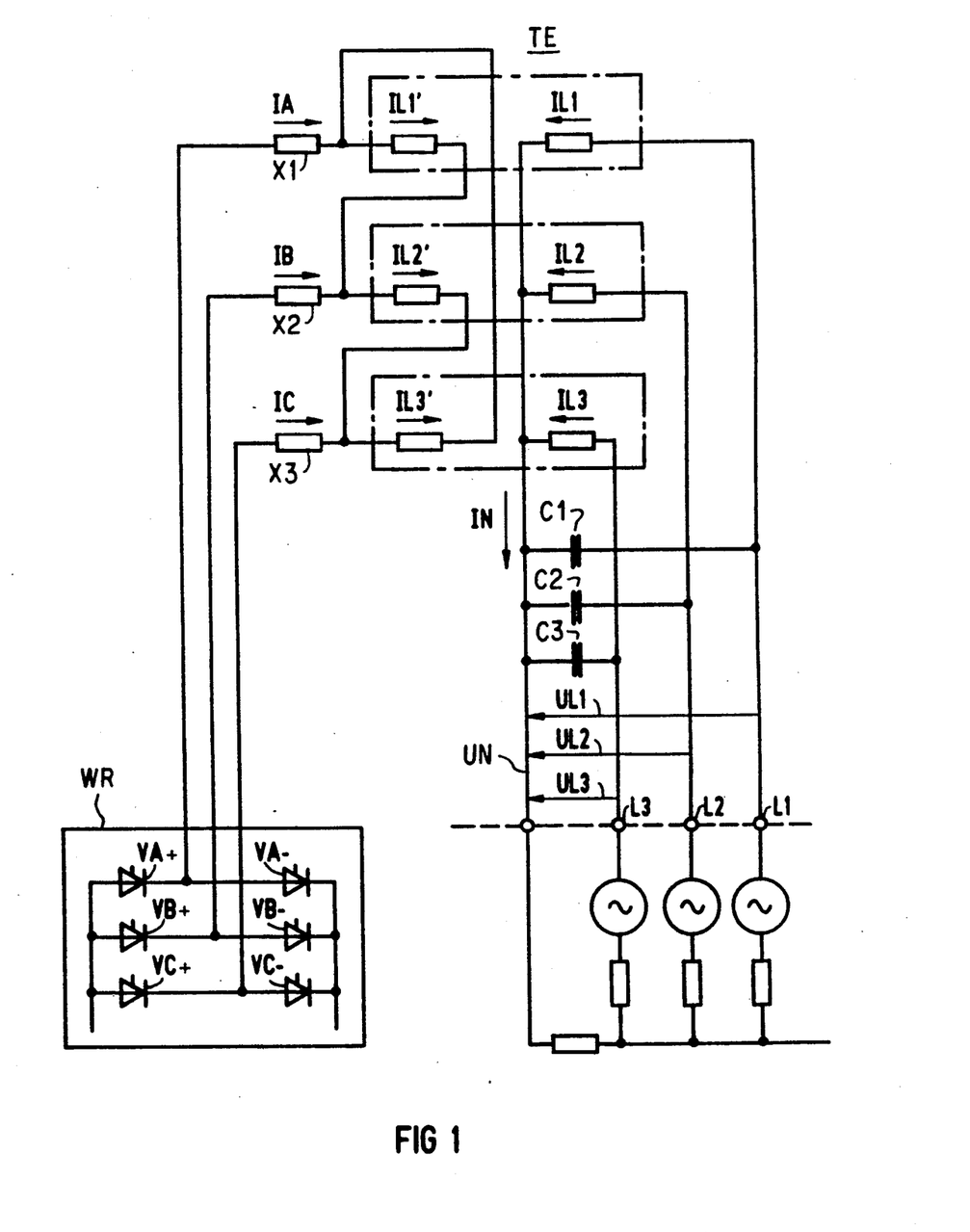
FIG. 1 is a general block diagram of the power circuitry of the device constructed according to the present invention.

Referring to FIG. 1, a general block diagram of the device of the present invention is shown. A voltage source VD (not shown) is coupled at the direct voltage input of an invertor WR. The phase voltages ULI, UL2, UL3 of the three-phase voltage system are supplied to the neutral conductor UN of the secondary side. These phase voltages UL1, UL2, UL3 can be loaded with active or passive loads in any combination. Therefore, these phase voltages represent an asymmetrical system that is encumbered by a zero-phase-sequence of signals This also applies to the corresponding phase currents IL1, IL2, IL3 and to the current IN, which is the sum of the phase currents IL1, IL2, IL3 flowing into the neutral point. The phase currents IL1, IL2, IL3 are drawn from the secondary side of the transformer device TE. In this embodiment, the transformer device TE comprises single-phase transformers featuring a wye connection of the secondary windings and a neutral point coupled to the neutral conductor UN. The primary windings of the transformers are delta-connected. Filter chokes X1, X2 and X3 and filter capacitors C1, C2 and C3 are provided, as well. In principle, the filter chokes X1, X2 and X3 and filter capacitors C1, C2 and C3 can be coupled in any configuration. For example, the capacitors C1, C2 and C3 can be delta-connected and connected on the primary side. Alternatively, the chokes X1, X2 and X3 can be configured on the secondary side. In the present embodiment of the invention, the chokes X1, X2 and X3 perform a filter function, particularly that of a low-pass filter, coupled in series to the actual transformer.

The transformer, itself, can also have a wye connection instead of a delta connection on the primary side, provided that its neutral point is not loaded. If no galvanic, electrical isolation is required, then a conventional, neutral, electromagnetic coupler can also be used. The conversions employed in the present invention depend on the structure of the transformer device. The conversions employed in other circuitry, which are well known in the art, can be applied in the present invention.

The invertor valves VA+ and VA− are coupled in series and their junction point A is coupled to the filter choke X at the input of the transformer device TE. In the sense of a pulse-width modulated invertor operation, these invertor valves VA+ and VA− are triggered by a single control signal UA*. The valves VA+, VA− represent a bridge-arm pair which is coupled to the input d.c. supply voltage VD. The individual control voltages UB* and UC* control the other two bridge-arm pairs of the invertor WR, which are coupled to the filter chokes X2 and X3 at the corresponding inputs of the transformer device TE. The currents and voltage drops across the filter chokes X1, X2, and X3 are designated by IA, IB and IC. The secondary-side voltages are coupled to terminals L1, L2 and L3 and to the neutral conductor UN of the three-phase voltage system. The secondary-side voltages are also wired to an arbitrarily distributed load. The system of the secondary-side voltages is denoted by UL.

Figure 2:
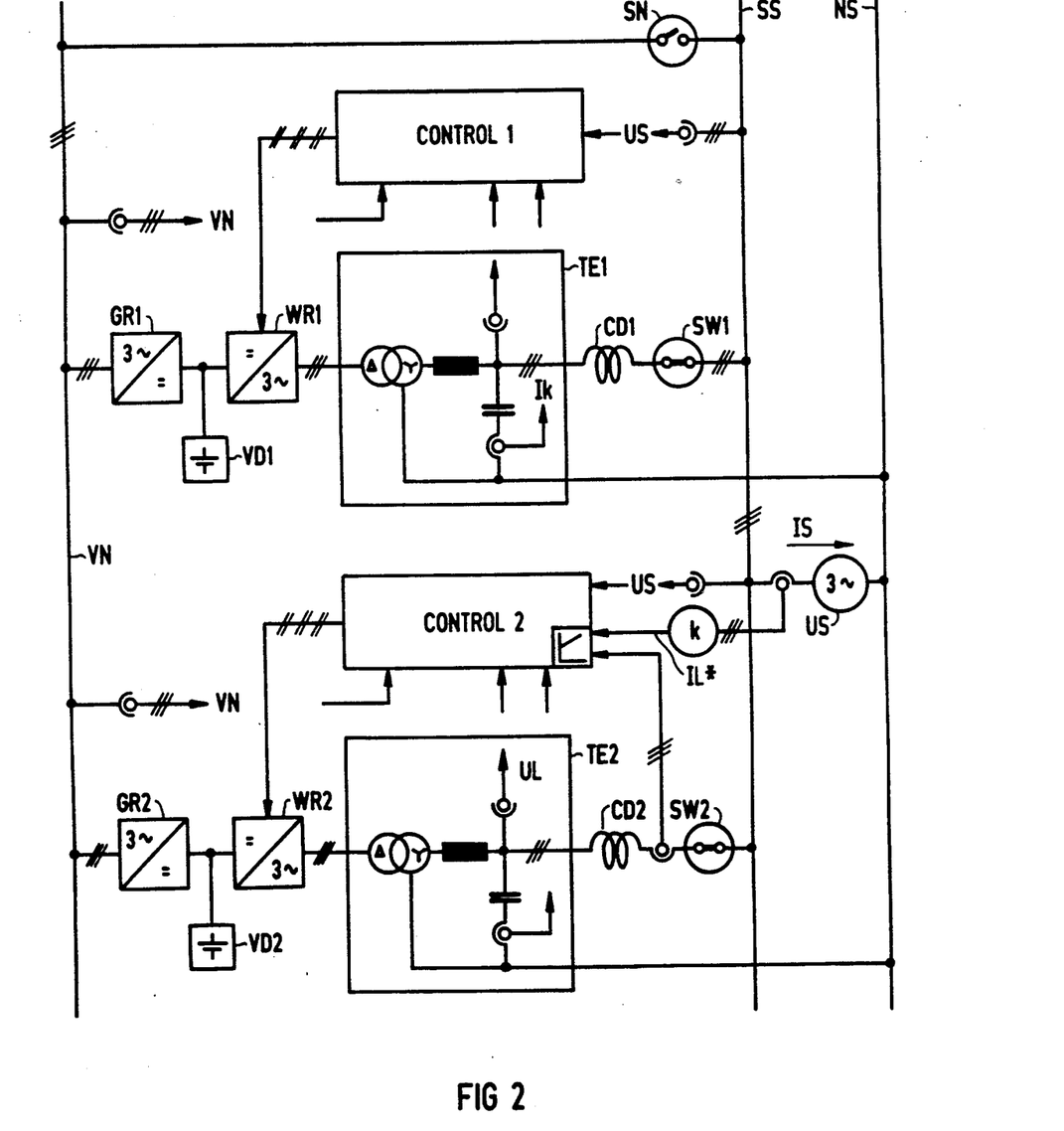
FIG. 2 is a detailed diagram of the power circuitry of the device constructed according to the present invention.

Referring to FIG. 2, an embodiment of the present invention is shown. A safe busbar SS of a consumer network is provided which contains a variety of elements, including possible active elements. The safe busbar SS is coupled to a neutral conductor NS. A supply system VN supplies voltage to the safe busbar SS. The supply system VN is galvanically coupled to the safe busbar SS through a main supply switch SN. The safe busbar SS is separated from the supply system VN in case of a disturbance in the voltage VN or any other situation that requires their separation. For example, in case of a short circuit on the safe busbar, the main supply switch SN is used to conduct the stepped-up current to knock-out fuses, instead of to the invertors.

During normal operation, the current flowing through the invertors GR1, GR2 (and possibly additional invertors) is used to load storage devices VD1 and VD2 such as batteries. The storage devices VD1 and VD2 are used for supplying d.c. voltage. These storage devices VD1 and VD2 are coupled to the safe busbar SS via first and second invertors WR1 and WR2 and the transformer devices TE1 and TE2. The storage devices VD1 and VD2 may possibly be coupled to the safe busbar SS via other coupling inductors CD1, CD2 and invertor switches SW1 and SW2, as well. Various measuring elements are shown in FIG. 2. The measured voltage values of the supply system VN are required to calibrate the first invertor WR1. The measured values of the voltages across the safe busbar SS and across the first invertor WR1, which is coupled to the safe busbar SS, are required to calibrate the second invertor WR2. Possibly, the measured values for current (e.g. the output current IL and the currents IK flowing through the capacitors) are required for the current regulator.

If the supply system VN is fault-free, calibration of the first invertor WR1 will ensure that the first invertor WR1 will be capable of supplying power at any time, even in case of a system disturbance. When the main supply switch SN is in an open state, the calibration of the first invertor WR1 matches the voltage US to the supply voltage VN, so that there is no unsteadiness in the voltage US when closing the main supply switch SN.

The firing pulses for the invertors WR1 and WR2 are supplied by regulating and control elements, "control 1" and "control 2", which are similar in design. When the main supply switch SN is in an open state, the first invertor WR1 builds up a three-phase voltage system US which is specified by setpoint values. Initially, this three-phase voltage system US can generally be encumbered asymmetrically and with a zero-phase-sequence system according to the arbitrary and unknown conditions of the connected load. The three-phase voltage system US, therefore, possesses three degrees of freedom. The currents which are then injected through the first invertor WR1 into the three-phase voltage system adapt freely according to the nature of the load, and no current control is provided for "control 1".

On the other hand, the second invertor WR2 provides a specific fraction k of the current required to maintain the voltage system US in the load power supply. This fraction of the load current is a setpoint current system IL* and is supplied with the actual-value current system IL at the output of the transformer device TE2 to a superposed current control in the regulating and control component "control 2".

In automatic control, it is necessary to realize that in a zero-phase-sequence system, the equation:

$$UL1 + UL2 + IL3 = 3 \cdot UO$$

holds true not only in the current system IL but in the actual-value system UL, as well. However, such zero phase-sequence systems cannot be injected by the invertor into the primary windings of the transformers. If the inductors of the filter chokes and the individual transformers are combined to form inductive resistors XA, XB, and XC, then, based on the transformation coupling (assuming a voltage ratio k), stand-by voltages UL12′, UL23′ and UL31′ can be applied to the primary windings, such that:

$$k \cdot UL12' = UL1$$

$$k \cdot UL23' = UL2$$

$$k \cdot UL31' = UL3.$$

A primary-side zero phase-sequence system $U_o'$ is produced by a circulating current in the transformation circuit corresponding to the secondary-side current zero phase-sequence system and is added to all linked, equivalent actual values.

Any asymmetry in the secondary voltage system is corrected if symmetrical setpoint values are specified on the primary side. For example, a symmetrical setpoint system that is not a zero phase-sequence system, such as UL12*, UL23*, UL31*, can be used as equivalent actual values on the primary side, and the asymmetry of the secondary voltage system is thus corrected. The current flowing into the asymmetrical load can be applied by an invertor and results in corresponding current-dependent voltage drops XA·IA, XB·IB, and XC·IC.

To force the voltage system UL into symmetry, for example, where UL1=UL12*, UL2=UL23*, and UL3=UL3*, a voltage control device, which is supplied with the system deviations of the voltage system UL, directs the invertor to output a line-to-line voltage system where $$UAB^* = XA \cdot IA + UL12^* - XB \cdot IB$$

$$UBC^* = XB \cdot IB + UL23^* - XC \cdot IC$$

$$UCA^* = XC \cdot IC + UL31^* - XA \cdot IA.$$

According to the standard conversion, a system of equivalent actual values can also be formed from the linked, equivalent actual values. This system of equivalent actual values appears at imaginary inputs L1', L2', L3' of imaginary individual transformers, which are designed to have no induction, whereby if k=1, then:

$$UL1' = (UL12' - UL31')/3 = (UL1 - UL3)/3$$

$$UL2' = (UL23' - UL12')/3 = (UL2 - UL1)/3$$

$$UL3' = (UL31' - UL23')/3 = (UL3' - UL2)/3.$$

Such a conversion is the inverse of the relations:

$$UL12' = UL1' - UL2'$$

$$UL23' = UL2' - UL3'$$

$$UL31' = UL3' - UL1'.$$

Referring to the upper part of FIG. 2 an equivalent circuit diagram of FIG. 1 is shown, whereby the transformer device TE is represented by impedances and by elements corresponding to the imaginary transformers.

Figure 3:
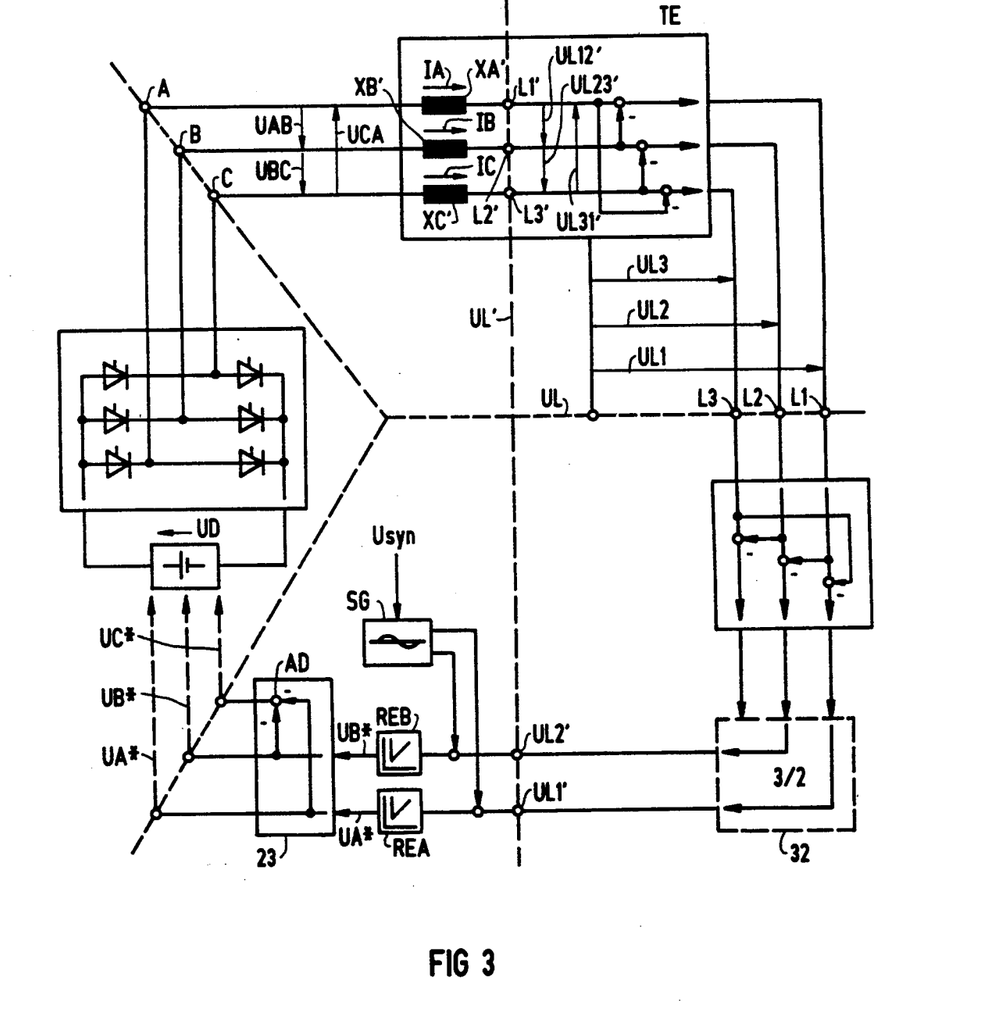
FIG. 3 is the principle detailed diagram of the power circuitry of the device constructed according to the present invention.

Referring to the lower part of FIG. 3, the circuit for converting the actual-value system UL is shown. The actual-value system UL is converted into the equivalent values UL1', UL2' and UL3' in the converter control for the primary side by means of a break-down element 32, and are then compared to setpoint values from a setpoint adjuster SG.

The setpoint adjuster SG is calibrated to a synchronizing voltage system Usyn. For the first invertor WR1, Usyn is the supply voltage. For the second invertor WR2, Usyn is either the output voltage of the first invertor WR1 or its setpoint value system or also the three-phase voltage system US already established by the first invertor. At a defined setpoint amplitude Usyn, frequency f*, and phase position f*·t, the setpoint adjuster SG supplies the following synchronized voltage system:

|Usyn|·cos(f*·t)

|Usyn|1 cos(f*·t+2π/3)
|Usyn|·cos(f*·t+4π/3).

In the present case, the symbol "3/2" indicates that the equivalent actual value UL3' is suppressed by the break-down element 32. A third voltage, which can be determined by the equivalent actual values −UL1' and −UL2', would supply a zero-point-free system, which could only be described by these values UL1' and UL2'.

This 3/2 conversion for suppressing the zero phase-sequence system is cancelled at the control input of the invertor by a "2/3 transducer" 23. This 2/3 transducer 23 forms the individual control signal UC* for the bridge-arm pair that controls the output voltage UC from the other individual control signals UA* and UB*, according to the equation UC*=−UA*−UB*. UA* and UB* are supplied by voltage control devices REA and REB for the system deviations UL1*−UL1' and UL2*−UL2'.

Therefore, for every equivalent actual value, the voltage control device can contain a separate controller. Although the invertor can make asymmetrical systems available, it cannot provide zero phase-sequence systems of current and voltage. Therefore, with corresponding 2/3 and 3/2 transducers on both sides, it is sufficient to have just two controllers for two corresponding controllers, synchronized accordingly.

Particularly symmetrical setpoint voltages having an amplitude U* and a frequency f* are specified by the following orthogonal setpoint voltages:

$$U^*_\alpha = U^* \cdot \cos(f^* \cdot t);$$

$$U^*_\beta = U^* \cdot \cos(f^* \cdot t + \pi/2).$$

Corresponding voltages $U_R$, $U_S$, $U_T$, which are zero-phase-sequence free, can be converted to these orthogonal setpoint voltages $U^*_\alpha$, $U^*_\beta$ by means of "αβ/RST-transformers" and "RST/αβ-transformers". These transformers are computing elements which are already standard for rotational-frequency controlled three-phase current machines, for example.

Figure 4:
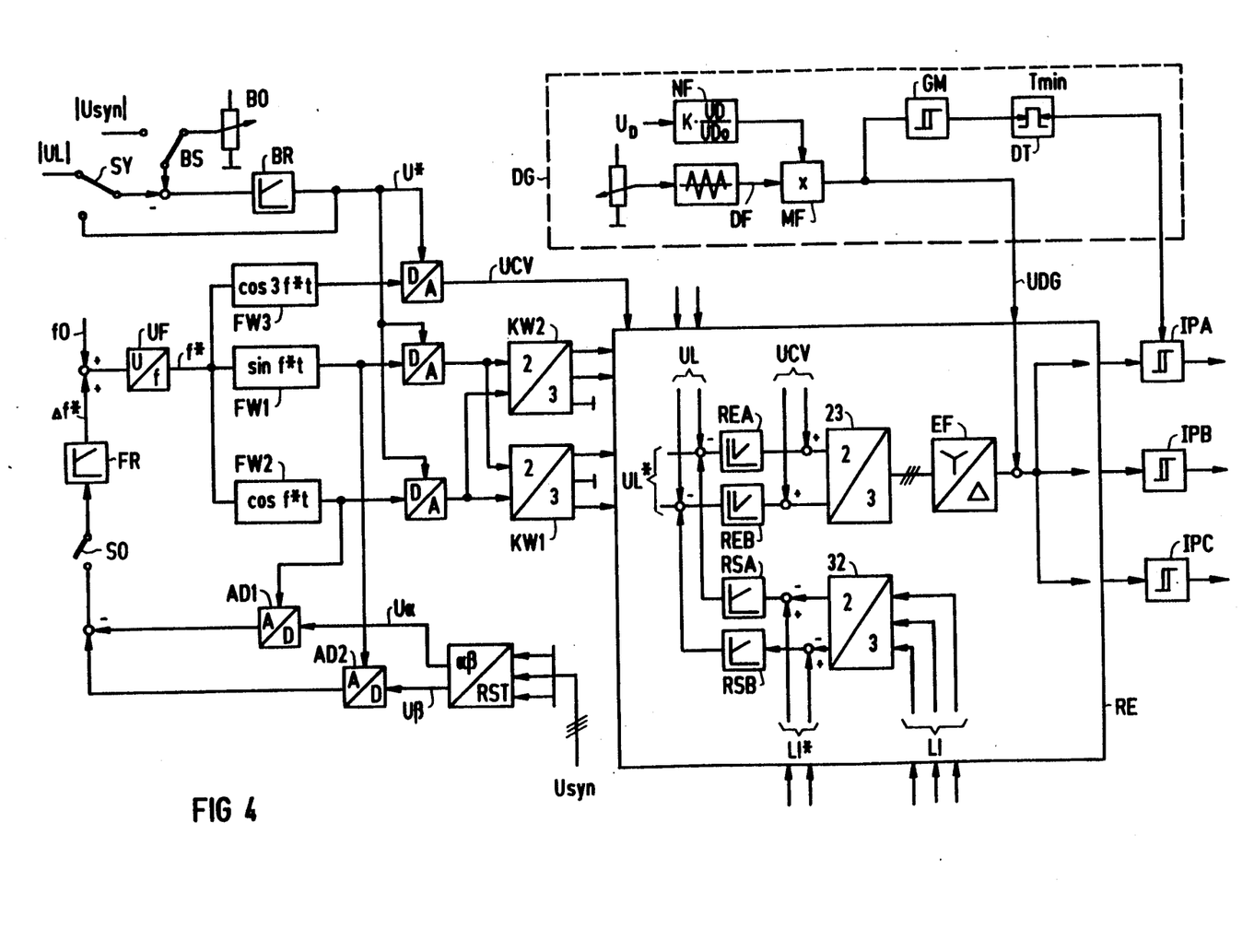
FIG. 4 is a diagram of an automatic feedback control and invertor control for the device of the present invention.

Referring to FIG. 4, the structural component RE is shown in detail. The break-down element EF is arranged in the correcting-variable channel of the voltage control devices. A third-degree harmonic oscillation is superposed on the output variables of the voltage control devices to a trapezoid shape, as is described in U.S. Pat. No. 4 719 557. For this purpose, corresponding voltages UCV, which are formed from the setpoint values of the voltage control device, are added before the 2/3 conversion.

For the second invertor WR2, the actual-value system UL is compared at the controller input to the sum of one voltage setpoint value supplied by the setpoint adjuster and one additional setpoint value. These additional setpoint values are tapped off at superposed current controllers, whose actual values represent a zero-sequence-free system LI, and are compared to corresponding setpoint values LI*. In this connection, the setpoint voltage system UL* and the setpoint current system LI* are specified by only two signals, so that only two voltage control devices REA, REB and two current control devices RSA, RSB, together with corresponding transducers 23 and 32 are needed.

The individual control signals UA*, UB*, UC* are pulse-width modulated in pulse forming elements IPA, IPB, and IPC by a modulation voltage, specifically a triangular wave voltage UDG, supplied by a modulation-voltage generator DG. For example, in the pulse forming element IPA, a control pulse UA*+ is formed from the difference UA*-UDG, as long as UA* is larger than UDG and the valve VA+ is to be triggered. If UA* is smaller than UDG, then the valve VA+ is blocked by the signal UA*-. The pulse-width modulated signals ensure that each valve is triggered for at least one time period with a specified minimum time of T-min within each clock-pulse period of the modulation cycle.

Figure 5:
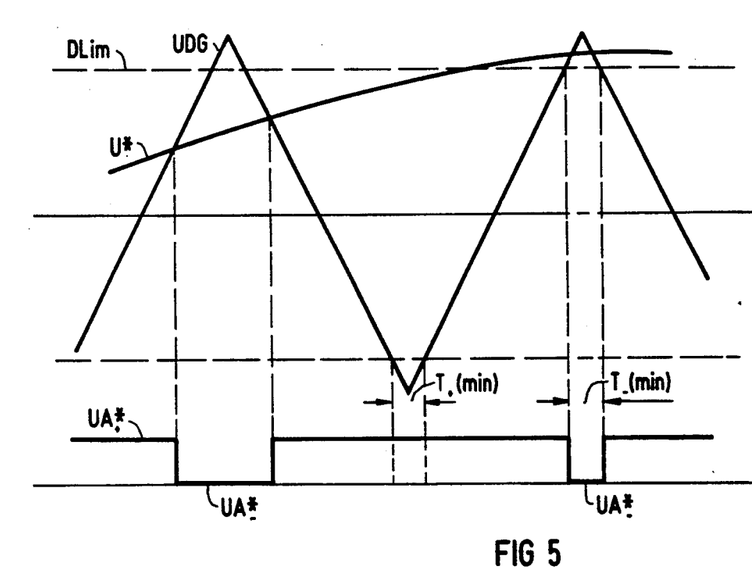
FIG. 5 is a graph of the pulse-width modulation of a single controlled variable of the present invention.

Referring to FIG.5, a graphical representation of a firing pulse UA*− is shown. The firing pulse UA*− has an adequate duration which results from the initial characteristics of the individual control signal UA*. However, a firing period of less than T-min would result while UA*>DLim because the difference UA*- −UDG remains negative for a shorter duration. When this occurs, a high continuous current exists in this valve for invertor circuits having a low internal resistance. As a result of the pulse-width modulation, the valve VA-would not be at a zero current at all for several modulation cycles.

Therefore, a limit monitoring indicator GM (FIG. 4) derives a signal for the upper inversion point, such as when UDG≧DLim, and/or by means of a frequency-dependent timing element DT. Using interconnections in the pulse forming element IPA, the signal generated by the limit monitoring indicator GM guarantees a firing pulse UA*-having an appropriate minimal duration for the value T− (min). Minimum time periods T+min are provided for the valve VA−, which is controlled by the signal UA*.

The voltage ratio between the individual control signal UA*, which is formed by the automatic control, and the amplitude of the modulation voltage UDG determines the magnitude of the output voltage UA, relative to the input d.c. voltage UD. Therefore, if, for example, the input d.c. voltage UD drops due to an extended battery operation of the invertor, a voltage deviation results which the controller must correct.

To keep this voltage deviation as small as possible and to ensure that the proportional relationship between the individual control signal UA* and the corresponding actual value of the output voltage remains constant, the individual control signals are pulse-width modulated by a triangular wave voltage, whose amplitude is specified depending upon the input d.c. voltage. For example, the frequency and amplitude of a triangular wave voltage DF can be set by a potentiometer. At the same time, a compensating element NF specifies a factor for a multiplying element MF so that, the proportionality factor is equal to the quotient UD/UDO except for a constant K according to the deviation of the actual input d.c. voltage UD from a setpoint value UDO.

Referring to FIG. 4, the preferred design of a calibrating device for processing the synchronizing voltage Usyn in the setpoint adjuster SG is shown. The synchronizing device will be able to handle the operational cases occurring in FIG. 2. If, for example, only a passive load is to be fed through the first invertor WR1 when the main supply switch SN is in an open state (meaning isolated operation in FIG. 2), then a calibration is usually not required.

It is sufficient, then, to specify a frequency setpoint value of, which a voltage-frequency converter UF converts into a frequency-control voltage f*. With this frequency-control voltage f*, corresponding phase-angle sensors FW1, FW2 are controlled to generate the functions sin($\int$f*.dt), cos($\int$f*.dt). Two orthogonal components of a three-phase voltage system having a rotational frequency $f_o$ are generated, and a desired setpoint value amount is combined into these components in multiplying digital-to-analog converters.

In the present embodiment, this setpoint value amount is tapped off at the output of an absolute-value controller BR. The setpoint value of the absolute-value controller BR is set to be constant by an absolute-value changeover switch BA at a potentiometer BO. The amount |UL| of the actual-value system of the voltage UL is applied to the actual-value input. The invertor then generates, even in case of an asymmetrical load at the safe busbar SS, a voltage system having an amplitude BO and a frequency of $F_o$.

If a disturbance occurs in the consumer network which leads to a drop in the voltage of the safe busbar SS, then by closing the main supply switch SN, the supply system VN should be able to take over the supplying of voltage. To prepare for such a condition, the setpoint-value system UL* for module RE can be calibrated to the supply voltage VN, which is done, already, during normal operation.

The synchronizing voltage Usyn, from the voltage system, for example, can be detected at the phases RST of the voltage system VN. A RST/$\alpha\beta$-transformer forms a zero-sequence-free system having orthogonal voltages $U_\alpha$, $U_\beta$ which satisfy the following equations:

$$U_\alpha = |Usyn| \cdot \cos \alpha,$$

$$U_\beta = |Usyn| \cdot \sin \alpha.$$

These orthogonal voltages $U_\alpha$, $U_\beta$ specify a phase-angle setpoint value for the voltage system UL at the safe busbar SS. Using these values, multiplying analog-digital converters AD1 and AD2, which are controlled by the function generators FW1 and FW2, combine the synchronizing voltage Usyn with the standardized setpoint-value system, whereby, the following equation is satisfied:

$$|Usyn|\cdot\sin(\alpha)\cdot\cos(\int f^*\cdot dt) - |Usyn|\cdot\cos(\alpha)\cdot\sin(\cdot f^*\cdot dt)$$
$$= |Usyn|\cdot\sin(\alpha - \cdot f^* \cdot dt).$$

Thus a value is formed for measuring the phase deviation $(\alpha - \cdot f^*\cdot dt)$ between the synchronizing voltage and the setpoint voltage.

This phase deviation can be converted into an additional controlled variable for frequency Δf* by the frequency controller FR. The specified setpoint frequency value fO at the input of the converter UF is corrected with this additional controlled variable for frequency Δf*. If the supply voltage VN fails or if, in principle, the supply voltage VN is not supposed to be calibrated, the angle controller FR can be blocked by a corresponding switch S0. In this manner, harmonic oscillations and asymmetries contained in the synchronizing voltage are filtered out without any phase shift.

Moreover, the synchronizing voltage Usyn can also be formed from the voltage system US of the safe busbar SS, in order to synchronize the invertor to this voltage without any instabilities occurring.

It is an advantage, to correct the absolute-value controller BR to the value |Usyn| of the synchronizing voltage Usyn or to the fixed setpoint value BO. While the setpoint value is selected by the position absolute-value changeover switch BS, the selection is virtually determined between an automatic control and a control of the synchronized setpoint voltage by the position of the switch SY. In the case of a control, the controller output signal itself is fed to the actual-value channel of the absolute-value controller BR. This type of absolute-value control can also be blocked, if corresponding current regulators are superposed on the voltage-control devices of the control component RE. This must correspond, however to the operation of the second invertor WR2 in FIG. 2, when the first invertor WR1 is operating in parallel, and when the main supply switch SN is closed causing the parallel operation of the system.

Referring to FIG. 4, it can be seen that to increase voltage utilization, an additional function generator FW3 controlled by the voltage-frequency converter UF supplies the function $\cos(\int 3F^* \cdot dt)$ for a corresponding multiplying digital-to-analog converter. The output signal for this corresponding multiplying digital-to-analog converter is a symmetrical, zero-sequence-free setpoint voltage system of the third harmonic component, which, as a corresponding voltage UCV, is superposed on the output signals of the voltage-control device REA and REB.

Up until now, the digitized output signals of the function generators FW1 and FW2 serve only to establish the orthogonal components of the setpoint voltage system UL* for the secondary-side output voltages. These orthogonal components $U_\alpha$, $U_\beta$ are supplied to a $\alpha\beta$/RST-transducer KW1 when the control component RE works with RST systems. However, by means of the transducer KW2, they can also supply a component pair, which forms a setpoint value system that is displaced by 90° for the filter currents flowing through the capacitors of the filter devices. These setpoint filter-current values are required for the control component RE shown in FIG. 6.

Figure 6:
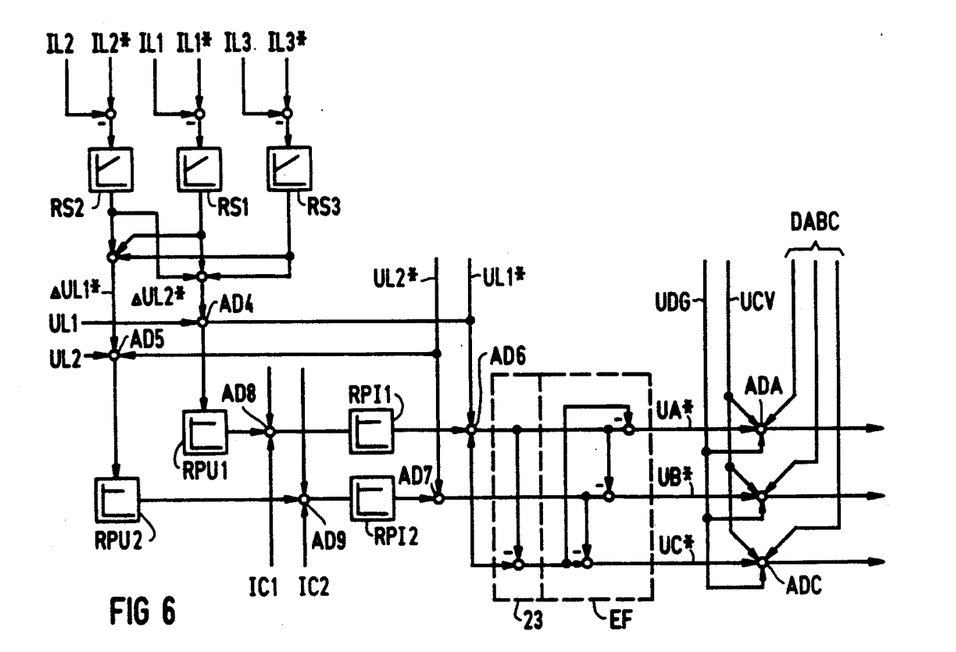
FIG. 6 is a diagram of the regulating component for the device of the present invention.

For the pulse-width-modulation, the voltage control shown in FIG. 6 uses summing elements ADA, ADB and ADC, which are each fed with the modulation voltage UDG and one of the output voltages of the break-down element EF. In this case, the summation is also made with the voltage UCV corresponding to the third harmonic component.

D.C. compensating voltages are designated by DABC. These voltages can be drawn at the output of a zero-point controller (not shown) for a smoothed output voltage of the bridge-arm pairs in order to cancel d.c. voltage components possibly contained in the output-invertor voltages.

According to the structure of the transformer device TE shown in FIG. 3, the input signals of the break-down element EF (except for an amplification which also allows for the transformer voltage ratio) represent actuating signals for the zero-sequence-free stand-by voltages. These stand-by voltages are calculated from the secondary-side voltages applied to the imaginary outputs L1', L2', L3' of the hypothetical impedances XA', XB', XC'.

Therefore, the invertor can be adjusted by making a control comparison between the actual values UL1 and UL2 and the setpoint values UL1* and UL2*. The voltage regulators are supposed to deliver a system of control signals, which are zero-phase-sequence free. Thus, the negative sum of two control output signals results in a third control signal, and a separate controller is not required for the formation of the third control signal.

Referring to FIG. 6, the system deviations are formed at summation points AD4 and AD5, at the input of the respective voltage control devices.

To accelerate the automatic control, precontrolled voltages derived from the setpoint voltage values themselves are superimposed at the output of these control devices by the summing points AD6 and AD7.

A proportional-integrated-derivative control response results for the dimensioning of the voltage control devices. The differentiating component is obtained in that the voltage differences UL1*−UL1 and UL2*−UL2 are applied to respective superposed proportional, or proportional integral, controllers RPU1 and RPU2. The output values of the controllers RPU1 and RBU2 are compared as setpoint values for capacitor currents to an actual current value tapped off at the capacitors and fed to secondary current controllers, preferably proportional-action controllers RPI1 and RPI2. Each controller, in this case the proportional-action controllers RPU1 and RPU2, that is superposed on a current controller is precontrolled by a precontrolled variable which is in phase quadrature and is formed from a setpoint value of the controller. These precontrolled variables ICI* and IC2*, are applied to the controller outputs (summing points AD8 and AD9) and tapped off at the coordinate resolver KW2 (FIG. 4) which was explained previously.

Referring to FIG. 2, the voltage control in "control 1" does not require the current-control devices RSA, RSB of FIG. 4. Thus, the resulting design of the control component RB is already described and corresponds to the device known from European Patent No. EP-A-208 088, which is supplemented by the elements described in FIG. 4 that calibrate and improve pulse modulation.

A current control, which in principle also operates without the previously described calibrated voltage control, is provided for "control 2" (FIG. 2).

For the currents [flowing] through the filter chokes according to FIG. 1, generally the following equations hold true:

$$IA = IL1' - IL3'$$

$$IB = IL2' - IL1'$$

$$IC = IL3' - IL2'$$

In these chokes, the following equations are true for the voltage drops:

$$UAA' = L1\left(\frac{d}{dt}IL1' - \frac{d}{dt}IL3'\right)$$

$$UBB' = L2\left(\frac{d}{dt}IL2' - \frac{d}{dt}IL1'\right)$$

$$UCC' = L3\left(\frac{d}{dt}IL3' - \frac{d}{dt}IL1'\right).$$

If the impedances L1, L2, L3 of the filter chokes are the same, the following equations for the line-to-line voltages at the invertor output hold true:

$$UAB = UL1' + UAA' - UBB' = UL1' + 2L \cdot \frac{d}{dt} IL1' -$$

$$L \cdot \frac{d}{dt} IL2' - L \cdot \frac{d}{dt} IL3'$$

$$UBC = UL2' + UBB' - UCC = UL2' + 2L \cdot \frac{d}{dt} IL2' -$$

$$L \cdot \frac{d}{dt} IL3' - L \cdot \frac{d}{dt} IL1'$$

$$UCA = -UAB - UBC$$

In principle, the following equations also hold true:

$$UAB = UL1' + 3L \cdot \frac{d}{dt} IL1' - L\frac{d}{dt}(IL1' + IL2' + IL3')$$

$$UBC = UL2' + 3L \cdot \frac{d}{dt} IL2' - L\frac{d}{dt}(IL1' + IL2' + IL3')$$

Also, when the secondary-side voltage drops produced by the currents IL1, IL2, IL3 are designated by U(IL1), U(IL2) and U(IL3), then:

$$UAD = UL1' + 3\Delta U(IL1)$$

$$UBC = UL2' + 3\Delta U(IL2)$$

where zero-phase-sequence systems which do not appear at the invertor are omitted.

In principle, then, the two current regulators RSA and RSB of FIG. 4 need only form the corresponding control signals UA*, UB* and UC* = −UA*−UB* of the invertor, where the structure of the transformer device in the closed-loop control system of the current regulator must be considered at the appropriate location (for example in the correcting-variable channel by means of the break-down device EF according to FIGS. 4 or 6). However, to have a stable and fast current control, it is advantageous to use a separate current regulator with a subsequently added suppression of a zero-phase-sequence system by means of 3/2 conversion and/or a voltage precontrolled for each phase.

While in the off-load case (IL1=IL2=IL3=0) and in the case of omitted capacitor currents, the line-to-line output voltages UAB, UBC and UCA of the bridge-arm pairs are equivalent to the voltages UL1', UL2' and UL3'. It applies in the general case according to FIG. 3 that:

$$UAB = UL1' + X \cdot IA - X \cdot IB$$

$$UBC = UL2' + X \cdot IB - X \cdot IC$$

$$UCA = UL3' + X \cdot IC - X \cdot IA.$$

Thus, by means of precontrolling the voltage, the invertor control signals can be initially specified from the setpoint values or actual values of the voltage systems UL or UL' with the appropriate break-down signals. At these invertor control signals, the voltage already generated by the network VN or the invertor WR1 is applied at the transformer output. The controller output signals then assure the desired current flow into the safe busbar SS by stepping up the voltages UL1', UL2' and UL3' by appropriate, current-dependent, supplemental setpoint values corresponding to the following equations:

$$UAB = UL1' + 2\Delta U(IL1) - \Delta U(IL2) - \Delta U(IL3)$$

$$UBC = UL2' + 2\Delta U(IL2) - \Delta U(IL1) - \Delta U(IL3).$$

The third line-to-line voltage UCA = UAB - UBC can then be formed again mathematically, such that:

$$UCA = UL3' + 2\Delta U(IL3) - \Delta U(IL1) - \Delta U(IL2).$$

Thus, if a particularly symmetrical voltage system UL1*, UL2* of setpoint voltages is specified for the zero-current case, and if this system is also to be maintained in the current-encumbered case at the invertor output, then, the line-to-line output voltages of the inventor must equalize the current-dependent voltage drops in the transformer device. For this purpose, as is shown in FIG. 6, the variables ΔUL1* and ΔUL2* are formed from the controller output signals, where a zero phase-sequence system is eliminated. Also, for this purpose, these output signals are used according to specified relations as supplemental setpoint values for the secondary voltage control devices (such as the controllers RPU1 and RPII for UL1 and RPU2 and RPI2 for UL2) at the summing points AD4 and AD5.

Similar relations can also be derived for more complex structures of the transformer device.

In this manner it is possible to sustain a virtually symmetrical voltage system in an uninterruptible power system or other installations with a parallel-working invertor, even when there is an asymmetrical load and/or a loaded neutral conductor, where a zero phase-sequence system is largely suppressed, even when dynamic changes are taking place.

What is claimed is:

1. A method for supplying voltage to a three-phase voltage system, whereby said system includes a load-carrying neutral conductor, said method comprising:
   supplying a frequency setpoint value;
   converting said frequency setpoint value into a controlled, instantaneous, phase-angle setpoint value;
   forming an amplitude setpoint value;
   forming a symmetrical setpoint three-phase voltage system from said phase-angle setpoint value and said amplitude setpoint value;
   generating a synchronizing voltage system;
   forming the phase difference between said synchronizing voltage system and said symmetrical setpoint three-phase voltage system;
   controlling a frequency-controlled oscillator device with said phase difference;
   tapping off from said frequency-controlled oscillator device said controlled, instantaneous, phase-angle setpoint value and said amplitude setpoint value;
   forming an actual voltage value of an actual value voltage system from the measured voltage values of the three-phase voltage system being supplied;
   supplying one setpoint voltage value of said symmetrical voltage system and one actual voltage value from said actual value voltage system to separate voltage control devices;
   forming three individual voltage control signals from the output signals from said separate voltage control devices;

forming three pulse-width modulated signals from said individual voltage control signals;

controlling the operation and output voltages of three bridge-arm pairs of a three-phase, pulse-width controlled invertor with said pulse-width modulated signals, whereby said three pulse-width modulated signals control said three bridge-arm pairs in a one-to-one correspondence;

coupling the output voltages of said bridge-arm pairs to three primary-coupled terminals of a transformer device, said transformer device comprising a neutral point coupled to the neutral conductor of said three-phase voltage system, and said transformer device comprising secondary coupling terminals coupled to the phase conductors of said three-phase voltage system, and converting the secondary-side voltages into primary-side voltages in a closed-loop control circuit of said control devices, said conversion corresponding to the structure of the transformer device.

2. The method of claim 1, wherein the output voltages of said bridge-arm pairs are supplied in a one-to-one correspondence to the primary coupling terminals of the transformer device, said primary coupling terminals being coupled to primary windings of single-phase transformers, and the secondary windings of said single-phase transformers are wye-connected.

3. The method of claim 1, wherein in said step of forming an amplitude setpoint value, said amplitude setpoint value corresponds to the amplitude of said synchronizing voltage system.

4. The method of a claim 3, wherein a signal corresponding to said amplitude of said synchronizing voltage system is supplied to a first input of an absolute-value controller, and either a signal corresponding to the amplitude of the three-phase voltage system or the output signal of the absolute-value controller is supplied to a second input of the absolute-value controller.

5. The method of claim 4, further comprising:
forming a control signal at the output of a disconnectible angle controller for forming the phase difference between said synchronizing voltage system and said symmetrical setpoint three-phase voltage, said forming a control signal only occurring when said angle controller is connected;
inputting a defined frequency setpoint value;
forming said control signal from said defined frequency setpoint value only occurring when said angle controller is disconnected;
supplying said control signal and said defined frequency setpoint value to said frequency-controlled oscillator devices.

6. The method of claim 1, further comprising:
forming a control signal at the output of a disconnectible angle controller for forming the phase difference between said synchronizing voltage system and said symmetrical setpoint three-phase voltage, said forming a control signal only occurring when said angle controller is connected;
inputting a defined frequency setpoint value;
forming said control signal from said defined frequency setpoint value only occurring when said angle controller is disconnected;
supplying said control signal and said defined frequency setpoint value to said frequency-controlled oscillator devices.

7. The method of claim 5 further comprising:

when a disturbance arises in said synchronizing voltage system, supplying a defined value for said amplitude setpoint value to said first input of said absolute-value controller, supplying a voltage signal corresponding to the amplitude of the three-phase voltage system to said second input of said absolute-value controller, and switching said angle controller off, and when said disturbance discontinues, supplying said signal corresponding to the amplitude of said synchronizing voltage system to said first input of said absolute-value controller, supplying the output signal of said absolute-value controller to said second input of said absolute-value controller, and switching said angle controller on.

8. The method of claim 1 further comprising: forming said synchronizing voltage system from measured voltage values, whereby said measured values are tapped off a supply network supplying voltage to said three-phase voltage system.

9. The method of claim wherein said symmetrical setpoint voltage system and said actual value voltage system each comprise two output signals and wherein two output signals, of said voltage-control devices, forming three individual voltage control signals, whereby the sum of said three individual voltage control, signals equals zero.

10. The method of claim I further comprising: measuring a capacitor-current actual value system across shunt capacitors in said transformer device;
forming a phase-shifted capacitor-current setpoint value system from said symmetrical setpoint voltage system;
forming a supplemental setpoint-value system from system deviations between the symmetrical setpoint voltage system and the actual value voltage system;
forming in said voltage-control device individual-voltage control signals, whereby said capacitor-current actual value system is adjusted to the sum of the values of said capacitor current actual value system and said supplemental setpoint-value system.

11. A method for supplying voltage to a three-phase voltage system, whereby said system includes a load-carrying neutral conductor, said method comprising:
measuring an actual current system flowing into said three-phase voltage system at phase connecting terminals of the three-phase voltage system;
forming a system deviation value corresponding to the difference between a setpoint current value and an actual value of the actual-current value system from a system of setpoint current values, said system of setpoint current values being zero-phase sequence free;
forming a current-control signal from each system deviation value by means of a current-control device;
forming three pulse-width modulated individual control signals from said current-control signals;
controlling three bridge-arm pairs of a three-phase, pulse-width controlled invertor with said three pulse-width modulated individual control signals, said pulse-width modulated individual control signals controlling said bridge-arm pairs in a one-to-one correspondence;
connecting the output voltages of said bridge-arm pairs to three primary connecting terminals of a transformer device, said transformer device includes secondary terminals and a neutral point on the secondary side only;

connecting a neutral conductor of the three-phase voltage system to said neutral point of said transformer;

connecting said secondary terminals to the phases of said three-phase voltage system; and converting the secondary-side voltages into primary-side voltages in a closed-loop control circuit of said control devices, said conversion corresponding to the structure of the transformer device.

12. The method of claim 11, wherein in said forming a setpoint current value system step, said formed setpoint current-value system has an amplitude which is a fraction of a measured value system, said measured value system corresponding to the currents flowing in the phases of the three-phase voltage system.

13. The method of claim 11 further comprising:
comparing said system of current-control signals to a voltage-measured value system, whereby values of said voltage-measured value system are tapped off at the outputs of said transformer device;

forming the system deviation value of one voltage measured value at a time by a current-control signal;

feeding said system deviation value to a separate voltage-control device;

forming pulse-width modulated individual control signals from the output signal of said voltage-control devices, whereby said conversion of the secondary-side voltages is performed in a closed-loop control circuit of said voltage-control devices and in a closed-loop control circuit of the current-control devices.

14. The method of claim 13, wherein said conversion of the secondary-side voltages step is performed at the output of said voltage-control device.

15. The method of claim 13 further comprising:
impressing a setpoint-voltage system being zero-phase-sequence free at the input of said voltage-control devices, said setpoint-voltage system being synchronized to the voltage values of the three-phase voltage system.

16. The method of claim 15 further comprising:
forming two supplemental voltage-setpoint values from the setpoint current value system and from the actual current value system, said supplemental voltage-setpoint values defining a symmetrical system of current-control signals;

determining said voltage-measured value system from two actual voltage values;

determining said setpoint voltage system from two setpoint voltage values, said setpoint voltage system being synchronized to the voltages of the three-phase voltage system;

supplying the deviation value of the actual voltage values from the sum of a setpoint voltage value and a supplemental setpoint voltage value to two voltage-control devices;

forming three signals from the output signals of said voltage-control devices, said three signals having a sum equal to zero;

forming said individual control signals from said three signals by means of pulse-width modulation.

17. A device for supplying voltage to a three-phase voltage system, whereby said system includes a load-carrying neutral conductor and three phase conductors, said device comprising:

a transformer device having a primary and a secondary side, said transformer device including a neutral point being coupled to said neutral conductor of said voltage system, said transformer device including on the primary side no neutral point;

a three-phase pulse controlled invertor having three bridge-arm pairs, each of said bridge-arm pairs having a controllable input for controlling the operation of said bridge-arm pair, each bridge-arm pair being coupled to said primary-side connecting terminals via three three-phase current connecting terminals in a one-to-one correspondence;

voltage measuring sensors having an input and an output, each input of said voltage measuring sensors being coupled to one of said secondary-side connecting terminals, said measuring sensors forming a system of actual voltage values at the output of said measuring sensor, said system being zero-phase sequence free;

voltage-control devices having a setpoint-value input, an actual-value input and an output, each of said actual-value inputs being coupled to the output of one of said measuring sensors in a one-to-one correspondence;

three pulse-width modulators, each coupled to an output of said voltage-control devices and to the controlling inputs of said bridge-arm pairs, said pulse-width modulators forming a pulse-width modulated control signal for each of said controlling inputs of said bridge-arm pairs;

a break-down device disposed in a closed-loop control circuit of said voltage control devices, said break-down device converting secondary side voltage of the transformer device into primary-side voltage in accordance with the structure of the transformer device;

a synchronizing device having an input for a synchronizing voltage system and outputs for synchronized setpoint voltage values of a setpoint voltage value system, said synchronizing device including a phase difference detector, said detector forming the instantaneous difference between the synchronizing voltage system and the setpoint voltage value system, said setpoint voltage value system being zero-phase-sequence free, said outputs of the synchronizing device being coupled to the setpoint value inputs of one of said voltage control devices;

an angle controller having a frequency controlled oscillator device, said frequency controlled oscillator device having a setpoint value input, and outputs, a setpoint voltage value being supplied to said input, said frequency controlled oscillator supplying synchronized setpoint voltages to said outputs, the outputs of said frequency controlled oscillator device being coupled to said synchronizing device and said phase-difference detector.

18. The device of claim 17, further comprising:
an absolute value controller having an input and an output, said absolute-value controller supplying a controlled, instantaneous, setpoint voltage value, said setpoint voltage value corresponding to the difference between the amplitude of the actual voltage value system and a specified setpoint voltage value;

whereby said angle controller can be disconnected, when said angle controller is disconnected, said oscillator device being controlled by a defined setpoint frequency value, and when said angle controller is disconnected, the setpoint value input being coupled to the output of said absolute-value controller, when said angle controller is connected, said absolute-value controller supplying a setpoint value corresponding to the amplitude of said synchronizing voltage system to the setpoint-value input of said oscillator device.

19. The device of claim 18, wherein said synchronizing voltage system is supplied to the three-phase voltage system parallel to the controlled invertor.

20. The device of claim 17, further comprising: current-control devices having an input and an output supplying supplemental setpoint values at the outputs of said devices, the outputs of said current-control devices being coupled to the setpoint value inputs of said voltage control devices;
  a system of setpoint current values;
  a system of actual current values;
  said systems of actual and setpoint current values being applied to the setpoint value inputs of said current-control devices; and
  current measuring elements, whereby the system of actual current values being supplied to said current measuring elements, said system of actual current values corresponding to currents flowing in said secondary connecting terminal of said transformer device.

21. The device of claim 20 further comprising:
  voltage detectors coupled to the phase conductors of the three-phase voltage system, said voltage detectors detecting said synchronizing voltage system, said voltage detectors supplying a signal corresponding to the amplitude of said synchronizing voltage system to the setpoint value input of said oscillator device.

22. The device of claim 20 further comprising:
  current detectors having an input and an output, said input coupled to the phase conductors of said three-phase voltage system, said current detectors supplying a fractional current to said output, said fractional current corresponding to a defined fraction of the amplitude of the currents flowing in the phase conductors of the three-phase voltage system.

23. The device of claim 17, wherein said systems of setpoint voltage values and actual voltage values each are described by first and second voltage signals, whereby each of said systems of signals is fed to separate voltage-control devices, said separate voltage-control devices forming a third voltage signal respectively for each system such that the sum of the first, second, and third voltage signals for each system equals zero, said first, second, and third voltage signals being supplied to pulse-width-modulators via the breakdown device.

24. The device of claim 23, wherein said transformer device includes shunt capacitors and each of said voltage-control devices comprises:
  a voltage controller; and
  a current regulator having a setpoint value input, an actual value input and an output, said current regulator coupled downstream to said voltage controller, a setpoint value corresponding to a phase shift of said setpoint voltage system being supplied to the setpoint value input of each of said current regulators, and currents flowing through said shunt capacitors in said transformer device being supplied to the actual value input of each of said current regulators.

25. The device of claim 24, wherein precontrol signals are added to the output signals of said voltage-control devices, said precontrol signals corresponding to the trebled frequency of said setpoint voltage value.

26. The device of claim 19 further comprising:
  d.c.-component controllers blocking d.c. components having an input and an output, said output of said d.c.-component controllers being coupled to the inputs of said pulse-width modulators, the average value of the output voltage signals of said bridge-arm pairs being added to said output signals of said d.c.-component controller.

* * * * *